United States Patent [19]

Lackinger

[11] Patent Number: 4,692,563
[45] Date of Patent: Sep. 8, 1987

[54] CABLE GLAND EMBODYING MOISTURE-PROOF SEAL

[75] Inventor: Franz Lackinger, Krugersdorp, South Africa

[73] Assignee: Westward Investments Limited, Hong Kong

[21] Appl. No.: 898,110

[22] Filed: Aug. 20, 1986

Related U.S. Application Data

[63] Continuation-in-part of Ser. No. 668,215, Nov. 5, 1984, Pat. No. 4,629,825.

[30] Foreign Application Priority Data

Feb. 28, 1986 [ZA] South Africa ............... 86/1512

[51] Int. Cl.[4] ............................................ H02G 15/04
[52] U.S. Cl. .......................... 174/65 SS; 277/116.8; 277/118; 285/353
[58] Field of Search ............ 174/65 SS; 285/353; 277/116.8, 117–122, 190, 191; 411/915

[56] References Cited

U.S. PATENT DOCUMENTS 2,960,831 11/1960 Lonaberger et al. ........ 277/116.8 X
3,215,208 11/1965 Tamplen ...................... 277/116.8
4,352,590 10/1982 Meier ........................ 174/65 SS X
4,629,825 12/1986 Lackinger ................... 174/65 SS Primary Examiner—Arthur T. Grimley
Assistant Examiner—D. A. Tone
Attorney, Agent, or Firm—Stevens, Davis, Miller & Mosher

[57] ABSTRACT

An electrical cable gland, generally of the type comprising two parts having a tubular configuration and interengaged by means of screw-threads is provided with an elastomeric tubular sealing sleeve, sealing onto a smooth outer surface of one part and engaging an end face of a second part so as to extend across and seal the entrance and outer surfaces of the screw-threads. The cable gland preferably has an internal armor clamp associated with electrically conductive metal inner parts and has its entire operative outer surface made of an electrically insulating and/or corrosion resistant material. The cable gland also preferably has an inner and an outer seal of the compression type.

10 Claims, 3 Drawing Figures

CABLE GLAND EMBODYING MOISTURE-PROOF SEAL

RELATED APPLICATION

This application is a continuation-in-part application of U.S. Pat. application Ser. No. 668,215 filed Nov. 5, 1984. Now U.S. Pat. No. 4,629,825.

FIELD OF THE INVENTION

This invention relates to electrical cable glands and, more particularly, to electrical cable glands embodying moisture-proof seal arrangements designed to prevent the ingress of moisture and dirt into the interior of the cable gland with the objective of minimizing or obviating corrosion of metallic conductors or parts in the interior of the cable gland.

Still more particularly, but not exclusively, the invention is directed towards electrical cable glands which embody an armor clamp assembly for mechanically clamping the ends of armor wires within the cable glands and in which case, the seal arrangement is intended, in amongst other things, to protect the armor wires against corrosion in use.

BACKGROUND TO THE INVENTION

There are numerous different designs of electrical cable glands on the market and which embody inner and outer seals, the outer seal being adapted to seal onto the outer sheath of an electrical cable, in use, and the inner seal being adapted to seal onto the inner sheath. An armor clamp assembly is provided between the two seals to clamp the armor wires of an armored electrical cable.

As indicated in our existing South African Pat. No. 84/8614 and United States counterpart thereto (the parent application in this case) such cable gland assemblies can have a weak point in their design in that, in most cases, an internally screw-threaded tubular member receives an externally screw-threaded member and moisture or vapors can travel along the screw-thread and thereby gain access to the interior of the electrical gland between the inner and outer seals thereof.

Our said earlier patent proposed the provision of a cylindrical sealing surface on the outside of one of such parts of a cable gland which was to be in sealing engagement with a peripheral skirt extending from the other of such parts to bridge the entrance to such screw-thread.

However, manufacturing tolerances on such an arrangement have proved to be difficult to maintain and, while such an arrangement operates effectively, it is the object of this invention to provide a simplified and more easily manufactured cable gland which provides an equivalent seal arrangement.

Furthermore, commercially available cable glands are not particularly well suited to use in corrosive surroundings such as in submersible pumps or other submerged locations in corrosive liquids or simply in corrosive environments such as coastal locations or chemical plants The only way in which contact with such corrosive liquids or environments is prevented is by a rubber or plastic shroud which generally has not proved to be satisfactorily effective. It is thus another object of this invention to provide a cable gland which has superior corrosion resistance when compared at least to most prior art cable glands.

SUMMARY OF THE INVENTION

In accordance with this invention there is provided an electrical cable gland comprising at least two tubular parts, a first one of which has an externally screw-threaded zone co-operating with an internally screw-threaded zone of the other or second part, said first part having, in addition, at a location remote from the internally screw-threaded second part, a smooth outer sealing surface with which co-operates an end region of an elastomeric sealing sleeve, the opposite end region of which is supported or preformed so as to flare outwardly upon axial compression thereof, the wall thickness of the sealing sleeve being small relative to its length so as to promote flaring and not simply axial compression, the arrangement being such that, upon operative installation, the adjacent end face of the internally screw-threaded second part contacts and seals against said opposite end region of the elastomeric sealing sleeve while urging the adjacent end region of the sleeve radially outwardly as the two parts are moved together by means of the screw-thread to effectively seal the screw-threads of the two parts from the exterior.

Further features of the invention provide for the externally screw-threaded first part to have an outer skirt spaced radially therefrom but rotatable in unison therewith, such skirt together with the said end face of the internally screw-threaded second part, forming a housing for the elastomeric sealing sleeve and, against the inner surface of which the end of the elastomeric sealing sleeve can sealingly engage in the event it moves sufficiently radially outwardly; for the elastomeric seal to have a thickened zone in the region thereof co-operating with the end face of the second part; for the electrical cable gland to be of the type embodying an armor clamp assembly for co-operating with armor wires on an armored electrical cable, in which case the electrical gland embodies both an inner and an outer seal for engaging the inner and outer sheaths of an electrical cable in use; and for both the inner and outer seals to be elastomeric compression seals.

Still further features of the invention provide for the second part (having the internally screw-threaded zone) to have an internal electrically conductive sleeve having electrically insulating and/or corrosion resistant material molded onto the outer surface thereof, for the first part (having the externally screw threaded zone) also to be made of electrically conductive metal but to carry an external electrically insulating and/or corrosion resistant cover or skirt defining member for covering exposed metallic parts thereof; and for the entire surface of the cable gland, in the operative position, to be formed from such electrically insulating and/or corrosion resistant material.

Most particularly, such electrically insulating material is chosen for its corrosion resistant properties and, accordingly, the electrical insulation properties may be of secondary importance and may be absent entirely although corrosion resistance is almost invariably associated with electrically insulating materials.

A still further feature of the invention provides for an armor clamp to be embodied within the cable gland and wherein the surfaces of the armor clamp adapted to engage armor wires, in use, are made of a material chosen for its resistance to galvanic corrosion and, in particular, in the case where the armor wires are of aluminum, for the co-operating surfaces of the armor clamp arrangement to be made of stainless steel.

It is preferred that such an armor clamp arrangement be of the type wherein a truncated conical clamping member and co-operating conical seat are employed to clamp the armoring therebetween and both the seat and the cone member are manufactured as separate parts and are each held captive relative to one of the two parts of the cable gland. In such a case only these two small parts need be made of stainless steel, or other costly metal chosen for its resistance to galvanic corrosion when in contact with the metal from which the armor wires are made and the other electrically conductive parts of the cable gland can be made of brass, optionally suitably plated, in the normal way. Conveniently the two parts of the cable gland for the basis for two sub-assemblies which between them include all components of the cable gland. In order that the above and other features of the invention may be more fully understood, one embodiment thereof will now be described with reference to the accompanying drawings.

DETAILED DESCRIPTION WITH REFERENCE TO THE DRAWINGS

Figure 1:
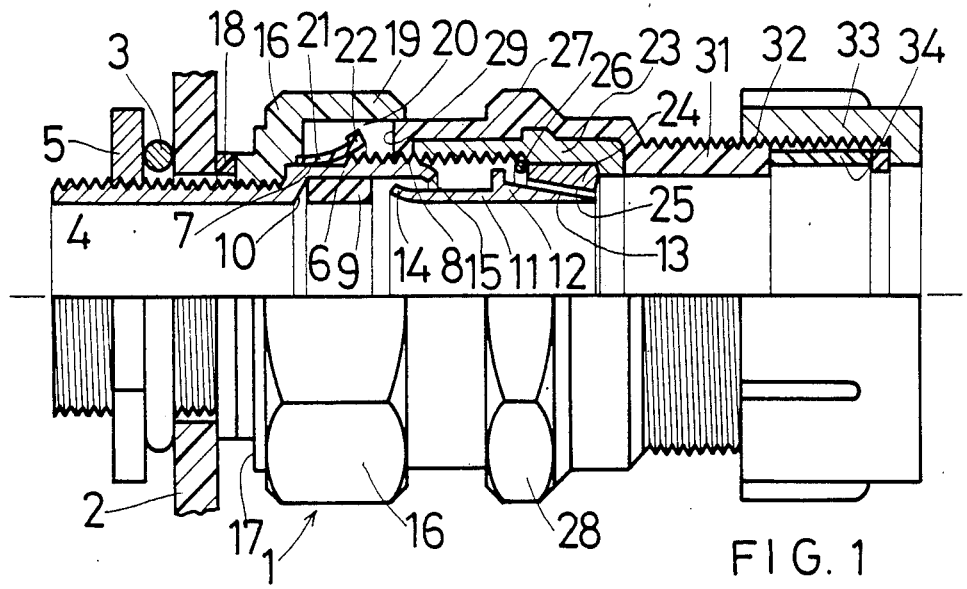
FIG. 1 illustrates, in partly sectioned longitudinal elevation, a cable gland according to this invention in the inoperative position.
Figure 2:
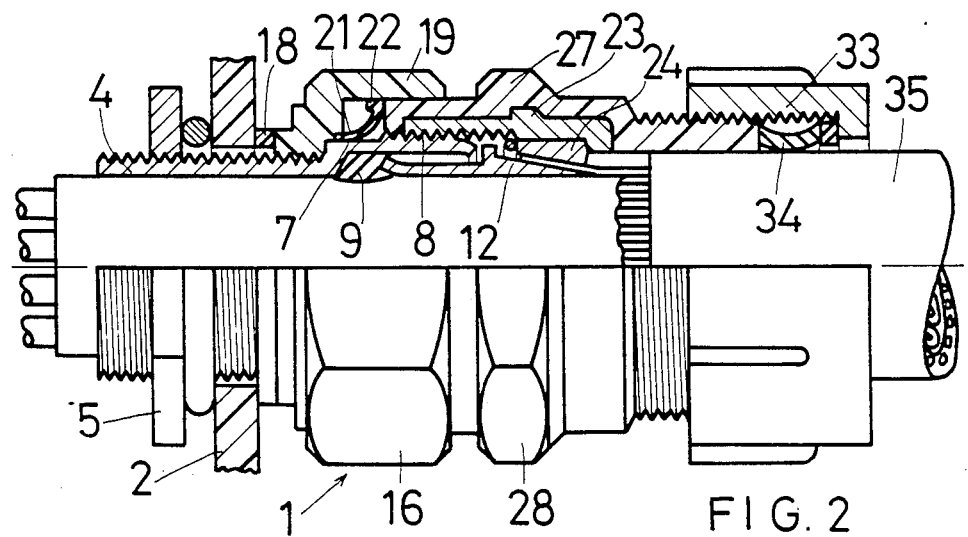
FIG. 2 illustrates, in similar view, the same cable gland in the operative position installed on an armored electrical cable, and, FIG. 3 is a sectional elevation of a molded elastomeric sleeve.

In the embodiment of the invention illustrated in the accompanying drawings, the electrical cable gland is composed basically of two sub-assemblies which are co-axial in use and are interconnected by co-operating internal and external screw-threads. The cable gland is of the general type embodying an armor clamp assembly designed to provide electrical continuity between the armor wires of a cable and an electrical connection box or an earth located therein. The cable gland of this embodiment of the invention is, in addition, designed to be substantially corrosion resistant and, in consequence, suitable for use in corrosive atmospheres and even suitable for use in electrical connections made in submerged locations such as submersible pumps or the like.

The one sub-assembly, generally indicated by numeral 1 is, in use, adapted to secure the cable gland to an electrical connection box 2 through an an aperture in the wall thereof. In this case, the electrical connection box is of an electrically insulating and corrosion resistant material and has an electrical earth continuity connection 3 located within the box.

This first sub-assembly has an electrically conductive externally screw-threaded tubular spigot 4 extending through the hole in the operative condition and secured therein by means of a suitable conductive nut 5 or the like to the electrical continuity ring.

Integral with the externally screw-threaded spigot is an enlarged diameter section 6 whereof the portion immediately adjacent to the spigot has a smooth cylindrical outer surface 7 which adjoins an externally screw-threaded zone 8 whereof the screw-threads stand proud of the smooth outer surface.

The bore through this first part of the cable gland also has a step change in diameter with the larger diameter being remote from the electrical connection box and housing an elastomeric compression inner seal 9 adapted to bear against the shoulder 10 formed by the step in the inner diameter.

The opposite end of the compression seal is in co-operating relationship with the inner end of a tubular extension 11 of a cone member 12 having at its opposite end an armor spreading cone 13 of an armor clamp of substantially conventional design. The cone member is held captive relative to the first part of the cable gland by an outwardly flared inner end of the extension (indicated by numeral 14) and a co-operating inwardly directed peened lip 15 at the end of the first part remote from the electrical connection box.

The cone member is thus free to rotate and move axially relative to the first part of the cable gland to a predetermined extent.

The first part can be machined from metal in the usual way but can be substantially thin-walled in view of the fact that it is ultimately protected from corrosive attack in the manner described below.

Screwed on to the spigot is a molded electrically insulating and corrosion resistant skirt defining member 16 having a complementarily internally screw-threaded hole for receiving the spigot and, conveniently, the skirt defining member is fixed in permanent association with the spigot simply by means of a suitable adhesive, for example, a cyanoacrylate type of adhesive.

An end face 17 of this skirt defining member is directed towards the wall of the electrical connection box and is sealed thereto, in use, by a corrosion resistant electrically insulating washer 18.

The skirt defining member provides a skirt 19 extending over substantially the entire length of the enlarged diameter section 6 of the first part but radially spaced apart therefrom to define a cavity 20. This skirt has a smooth cylindrical inner surface and an hexagonal-shaped outer surface for engagement by a wrench whereby the first part can be rotated during installation.

Clearly, during rotation of the first part by means of a wrench applied to the skirt defining member simply tends to move along the screw-thread of the spigot portion until it abuts the step change in diameter whereupon the rotational force is simply applied to the first part through the step.

Figure 3:
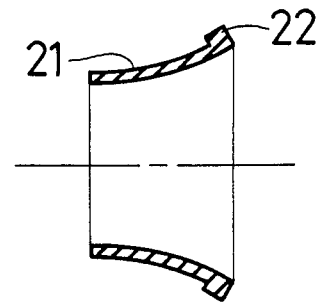

The first sub-assembly is completed by an elastomeric sealing sleeve 21 which sealingly engages the smooth outer surface of the enlarged portion of the first part and is sufficiently long to project over onto the raised screw-threads thereon, as illustrated clearly in FIG. 1. It is preferred that the outermost end of this elastomeric sealing sleeve be provided with a thickened zone 22 to ensure proper engagement with the end face of the second part as described below. Preferably, but not essentially, the sleeve is molded to a preset shape such that the end region remote from the smooth outer surface is flared outwardly as shown in FIG. 3.

The second sub-assembly consists of a tubular electrically conductive inner part 23 which receives, in captive manner, a ring 24 also of electrically conductive material and defining an inner tapered surface 25 for co-operating with the cone and which completes the armor clamp assembly. The ring 24 is held captive within this second part by a split-ring 26. The other end of this electrically conductive part is internally screw-threaded to co-operate with the screw-threads on the enlarged section 6 of the first part as shown clearly in the drawings.

Molded onto the outside of the electrically conductive second part is a covering of electrically insulating corrosion resistant material 27 which provides an hexagonal-shaped zone 28 for co-operation with a wrench.

The molded covering 27 extends over the entire outer surface of the electrically conductive second part and, indeed, over the end edge of such part adjacent the first sub-assembly. The end edge of the molded material thus provides a sealing face 29 directed towards the elastomeric sealing sleeve 21.

At the other end of the second part the molded material is formed into a tubular extension 31 having an externally screw-threaded free end 32 with which co-operates a union nut 33 made of electrically insulating corrosion resistant material and forming part of an elastomeric compression seal 34 adapted to define an outer seal and to co-operate with, and seal onto, the outer sheath of an electrical cable 35 in use.

It will be seen that the entire outer surface of the electrical cable gland is defined from electrically insulating, corrosion resistant material which, in the installed condition of the cable gland protects, together with the sealing sleeve, the entire metallic internal components of the cable gland. The only possible place where any metal could be attached, is at the junction between the two sub-assemblies and, in fact, via the screw-threads on the two co-operating parts of the cable gland and the seal provided by this invention obviates such contact.

Thus the corrosive materials are kept out of contact with the metallic components in consequence of the elastomeric sleeve being urged, in the first place, longitudinally so that its rear end engages the inner shoulder of the skirt defining member and, as the two sub-assemblies are screwed together, the elastomeric sleeve is contacted firstly with the end face of the cover material on the second part of the cable gland. Subsequent rotation of the two sub-assemblies relative to each other causes the end of the sealing sleeve engaged by the second part to move radially outwardly and, ultimately, to tend to roll back on itself, but, in any event, to seal against the inner surface of the skirt. In this manner a complete and effective seal of the joint between the sub-assemblies is achieved.

It has been found in practice that an electrical cable gland made as described above provides complete protection against corrosion of the metallic inner parts which, as will be understood, provides the required electrical continuity between the armor wires of an armored electrical cable and the electrical continuity ring on the inside of the electrical connection box. In fact, electrical cable glands of this nature have been employed, at least for test purposes, in connecting submersible pumps used for pumping corrosive liquids without any ill effects to the electrically conductive components of the cable gland.

The embodiment of the invention described above is also adaptable to an application in which, as opposed to the conventional steel armor wires, there are employed aluminum armor wires.

Generally speaking, where brass is the material of manufacture of the electrically conductive components of an electrical cable gland, such brass components cannot be contacted directly with the aluminum as galvanic corrosion sets in under those conditions.

In the above described embodiment of the invention all that needs to be replaced with suitable conductive metal are the parts actually contacting the armor wires, namely the armor spreading cone and the ring defining the co-operating seat therefor. Only these two components could be made of, for example, stainless steel and the two electrically conductive main parts of the cable gland could be manufactured of brass in the usual way. It is to be noted that neither the contact between stainless steel and brass nor the contact between the stainless steel and aluminum gives rise to galvanic corrosion.

It will be understood that numerous variations may be made to the above described embodiment of the invention without departing from the scope hereof. In particular it is possible to apply the invention to a two-part cable gland which does not necessarily embody an armor clamp but which does have two parts which interengage by means of a screw-threaded connection in an analogous manner to that described above.

What is claimed is:

1. An electrical cable gland comprising at least two tubular parts, a first one of which has an externally screw-threaded zone co-operating with an internally screw-threaded zone of the other or second part, said first part having, in addition, at a location remote from the internally screw-threaded second part, a smooth outer sealing surface with which co-operates an end region of an elastomeric sealing sleeve, the opposite end region of which is supported or preformed so as to flare outwardly upon axial compression thereof, the wall thickness of the sealing sleeve being small relative to its length so as to promote flaring and not simply axial compression, the arrangement being such that, upon operative installation, the adjacent end face of the internally screw-threaded second part contacts and seals against said opposite end region of the elastomeric sealing sleeve while urging the adjacent end region of the sleeve radially outwardly as the two parts are moved together by means of the screw-thread to effectively seal the screw-threads of the two parts from the exterior.

2. A cable gland as claimed in claim 1 in which the externally screw-threaded first part has an outer skirt spaced radially outwardly of the smooth outer sealing surface and external screw-thread, the skirt defining with said end face of the second part, a housing for the elastomeric seal.

3. A cable gland as claimed in claim 2 in which the inner surface of the skirt is smooth and adapted to be sealingly engaged, in the operative position, by the said opposite end region of the elastomeric seal where it extends radially to such inner surface.

4. A cable gland as claimed in claim 3 in which the outer skirt is formed as part of a separately molded skirt defining member made of an electrically insulating and/or corrosion resistant material and forming a cover for said first part of the cable gland, the second part also having a cover of electrically insulating and/or corrosion resistant material, the elastomeric sleeve serving to seal the two covers together in operation.

5. A cable gland as claimed in claim 4 in which the gland includes an armor clamp, an inner seal and an outer seal and the entire surface of the installed and operative gland is formed of electrically insulating and/or corrosion resistant material which encloses in sealed manner, any electrically conductive and corrodable parts.

6. A cable gland as claimed in claim 1 embodies an armor clamp composed of a tubular cone member and co-operating part conical surface wherein operative screwing of the two parts together urges the cone member and co-operating surface towards co-operating engagement.

7. A cable gland as claimed in claim 6 in which the gland assumes the form of two sub-assemblies, one comprising said first part having a tubular sleeve extending away from the first part in a direction away from the second part, the first part housing one inner compression type of seal and having captively associated therewith a cone member of an armor clamp, and a second sub-assembly comprising said second part which hold captively a ring having a truncated clamping surface for co-operation with the cone member and an outer compression type of seal at its end remote from the first part.

8. A cable gland as claimed in claim 7 in which the cone member has a tubular extension operative to axially compress the inner seal.

9. A cable gland as claimed in claim 7 in which the tubular sleeve and inner parts of the first sub-assembly are operative to define an electrically conductive path from the cone member to the sleeve and the co-operating inner parts of the second sub-assembly and the ring are electrically conductive whilst the entire outer surface of the operatively installed cable gland is made of electrically insulating and/or corrosion resistant material.

10. A cable gland as claimed in claim 1 in which the elatomeric sleeve has a preset initial outward flare towards its end adjacent the end face of the second part.

* * * * *